United States Patent
Tanaka et al.

(10) Patent No.: US 12,498,520 B2
(45) Date of Patent: Dec. 16, 2025

(54) INTEGRATED OPTICAL COUPLER

(71) Applicant: Intel Corporation, Santa Clara, CA (US)

(72) Inventors: Hiroki Tanaka, Gilbert, AZ (US); Brandon C. Marin, Gilbert, AZ (US); Kristof Darmawikarta, Chandler, AZ (US); Srinivas V. Pietambaram, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 846 days.

(21) Appl. No.: 17/559,871

(22) Filed: Dec. 22, 2021

(65) Prior Publication Data
US 2023/0194786 A1 Jun. 22, 2023

(51) Int. Cl.
*G02B 6/124* (2006.01)
*G02B 6/12* (2006.01)
*G02B 6/122* (2006.01)
*G02B 6/132* (2006.01)
*G02B 6/34* (2006.01)

(52) U.S. Cl.
CPC ......... *G02B 6/124* (2013.01); *G02B 6/12004* (2013.01); *G02B 6/1228* (2013.01); *G02B 6/132* (2013.01); *G02B 6/34* (2013.01); *G02B 2006/1204* (2013.01); *G02B 2006/12142* (2013.01)

(58) Field of Classification Search
CPC ...... G02B 6/132; G02B 6/12004; G02B 6/34; G02B 6/1228; G02B 6/124
See application file for complete search history.

(56) References Cited

U.S. PATENT DOCUMENTS

2001/0048540 A1* 12/2001 Konishi ............ H04B 10/2525
 398/182
2007/0297732 A1* 12/2007 Mason ............... G02B 6/12004
 385/122

* cited by examiner

*Primary Examiner* — Michael P Mooney
(74) *Attorney, Agent, or Firm* — Schwabe, Williamson & Wyatt, P.C.

(57) ABSTRACT

Embodiments herein relate to systems, apparatuses, or processes directed to an integrated optical coupler that may be used to optically couple a waveguide and a PIC. In embodiments, the integrated optical coupler may include an optical diffraction grating mechanism, an optical lens, and a Faraday rotator. In embodiments, the integrated optical coupler may at least partially within a housing. Other embodiments may be described and/or claimed.

23 Claims, 12 Drawing Sheets

INTEGRATED OPTICAL COUPLER

FIELD

Embodiments of the present disclosure generally relate to the field of optical packages, and in particular to optical coupling of optical waveguides and photonic integrated circuits (PIC).

BACKGROUND

Continued reduction in end-product size of mobile electronic devices such as smart phones and ultrabooks and increased requirements for performance is increasing the adoption of optical technologies within these devices.

DETAILED DESCRIPTION

Embodiments of the present disclosure may generally relate to systems, apparatus, techniques, and/or processes directed to an integrated optical coupler that may be used to optically couple a waveguide and a PIC. In embodiments, the integrated optical coupler may be referred to as an integrated optical coupler module. In embodiments, the integrated optical coupler may include an optical diffraction grating mechanism, an optical lens, and/or a Faraday rotator. In embodiments, the integrated optical coupler may be at least partially within a housing.

In embodiments, the optical diffraction grating mechanism may include a transparent grating layer or an induced diffraction grating using an acoustic wave front. The induced diffraction grating may use a transducer and an acoustic absorber to provide acousto-optic modulation. In embodiments, the integrated optical coupler may be placed within an optical path between a waveguide and a PIC.

In embodiments, the optical diffraction grating system may be able to adjust the alignment of light between the waveguide and a PIC. In embodiments of the integrated optical coupler where an acousto-optic modulator is used, fine alignment of the light between the waveguide and the PIC may be achieved by applying voltage to the transducer. In addition, optical diffraction of the integrated optical coupler allows multiple optical connectors on the PIC to receive different wavelengths of light that traveled down the optical waveguide. These embodiments may result in more efficient optical coupling between the waveguide and a PIC by improving their alignment by a diffraction technique. These may result in reduced optical loss by improving x-y alignment of the light beam as compared to legacy implementations.

Legacy implementations used for optically coupling a waveguide with a PIC have used direct optical coupling between the waveguide and a PIC. In these legacy implementations, the direct optical coupling may be difficult to accurately align during manufacturing. In addition, direct optical coupling using these legacy implementations may result in a higher amount of optical reflection from the direct coupling interface, which interferes with incoming light and creates optical noise.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

Figure 1:
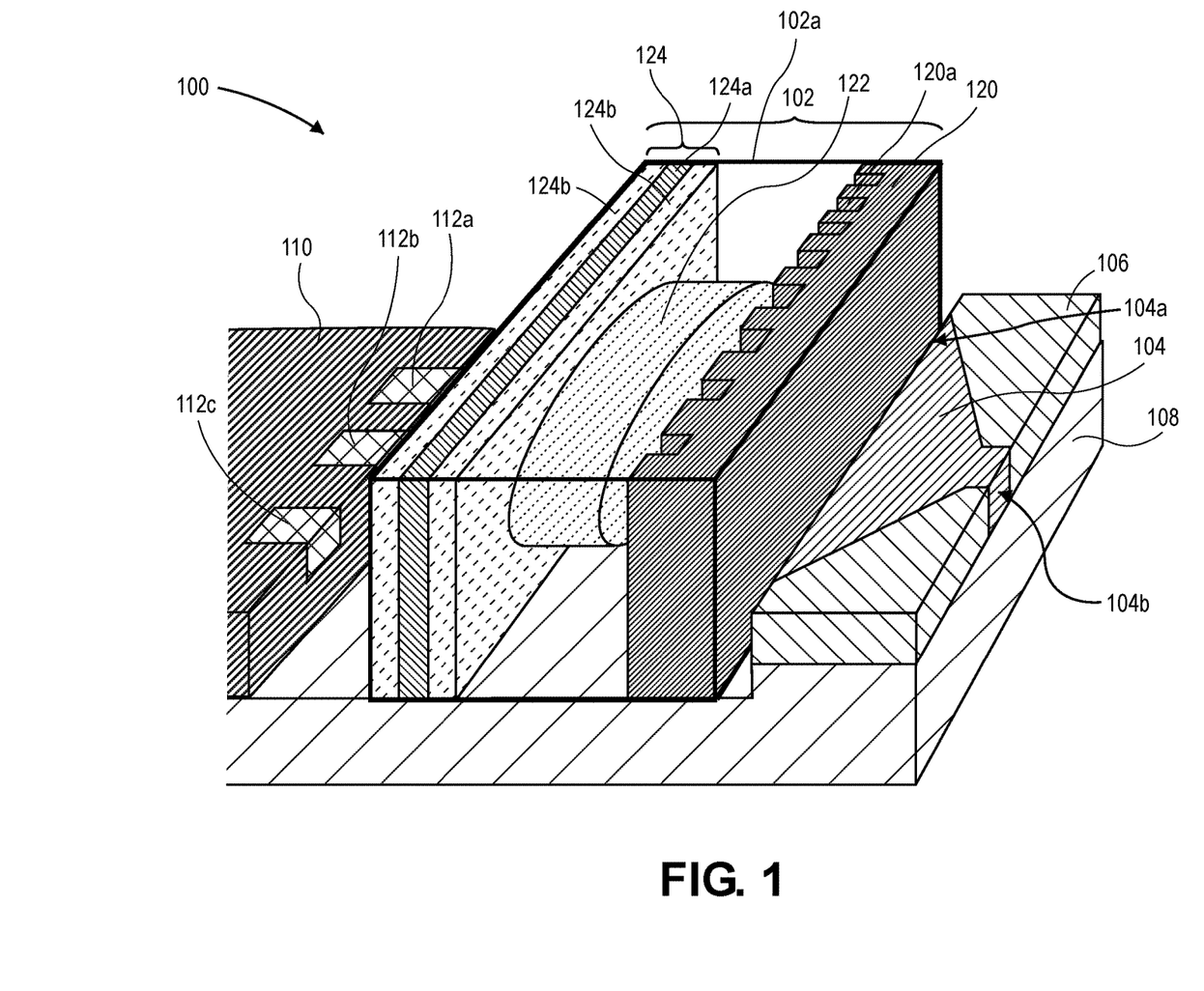
FIG. 1 shows a perspective view of an optical coupler that uses a transparent grating, in accordance with various embodiments.

FIG. 1 shows a perspective view of an optical coupler that uses a transparent grating, in accordance with various embodiments. Optical assembly 100 includes an integrated optical coupler 102 that is optically coupled with an optical waveguide 104. In embodiments, the optical waveguide 104 may be completely or partially within an electro-optical (EO) substrate 106. The EO substrate 106 and the optical waveguide 104 may be on an interposer 108. In embodiments, the interposer 108 may be a glass interposer. A PIC 110 that includes a plurality of optical connectors 112a, 112b, 112c may be on the interposer 108 as well.

Integrated optical coupler 102 may include a transparent grating 120 and optical lens 122, and a Faraday rotator 124. In embodiments, the transparent grating 120, which may also be referred to as a transparent optical grating or a diffraction grating, is used to accurately guide light in different directions. In embodiments, one example of a transparent grating 120 may be a rectangular shape.

In embodiments, the transparent grating 120 may include diffraction grating 120a and may have a defined depth, width, and/or pattern designed to diffract light depending upon the various wavelengths within the light. For example, a light beam with three different wavelengths entering through the optical waveguide 104 may have each of these wavelengths separated and focused on one of the three optical connectors 112a, 112b, 112c on the PIC 110. In embodiments, a pattern of the diffraction grating 120a within the transparent grating 120 may be oriented to adjust the light and the wavelengths within the light in x-y directions parallel to a surface of the EO substrate 106.

The optical lens 122, which is optically coupled with the transparent grating 120, may be a general purpose optical lens. The Faraday rotator 124 may be a polarization rotator based upon a magneto-optic affect involving transmission of light through material when a longitudinal static magnetic field is present. In embodiments, the Faraday rotator 124 may include transparent magnetic material 124a surrounded by polarizers 124b. In embodiments, the integrated optical coupler 102 may be partially within the housing 102a.

In embodiments, the transparent grating 120 may be directly optically coupled with a front edge 104a of the optical waveguide 104. In embodiments, this direct optical coupling may be formed within a dielectric material if it is coated or laminated with epoxy. In embodiments, the optical waveguide 104 may taper from a first width at edge 104b to a second width at front edge 104a. In embodiments, an angle of the taper may be determined based upon dimensions and a size of the PIC 110, as well as the number of channels, or waveguides, in the PIC 110. In embodiments, a taper should cover all waveguides within the PIC 110. In some embodiments, the integrated optical coupling 102 may include only the transparent grating 120.

Figure 2:
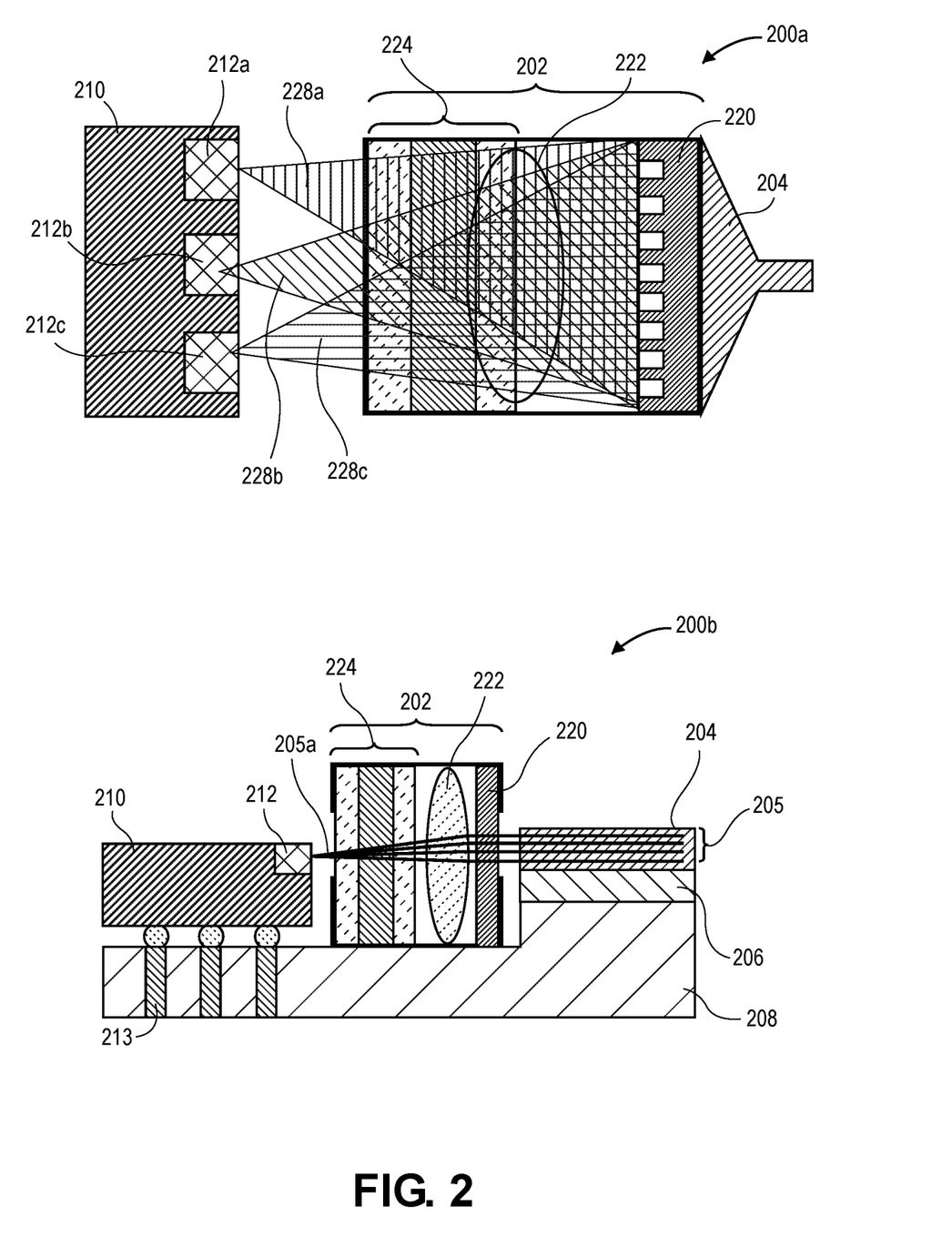
FIG. 2 shows a top-down view and a cross section side view of an optical coupler that uses a transparent grating, in accordance with various embodiments.

FIG. 2 shows a top-down view and a cross section side view of an optical coupler that uses a transparent grating, in accordance with various embodiments. Optical assembly 200a, which may be similar to portions of optical assembly 100 of FIG. 1, includes a top-down view of a PIC 210 that include three optical connectors 212a, 212b, 212c that are optically coupled with an integrated optical coupler 202. The integrated optical coupler 202 includes a transparent grating 220, a lens 222, and a Faraday rotator 224. An optical waveguide 204 is optically coupled with the integrated optical coupler 202. These may be similar to PIC 110, optical connectors 112a, 112b, 112c, integrated optical coupler 102, transparent grating 120, optical lens 122, Faraday rotator 124, and optical waveguide 104 of FIG. 1.

In embodiments, light passing through the optical waveguide 204 and into the transparent grating 220 may contain multiple wavelengths that may be separated by the transparent grating 220 into individual light beams 228a, 228b, 228c. In embodiments, each of these individual light beams may be targeted to a different optical connector on the PIC 210. For example, light beam 228a may be targeted to optical connector 212a, light beam 228b may be targeted to optical connector 212b, and light beam 228c may be targeted to optical connector 212c. In embodiments, the structure of the transparent grating 220 may be designed to separate various wavelengths as well as to focus them in their respective desired directions.

Optical assembly 200b, which may be similar to optical assembly 200a, is a cross section side view that also shows an EO substrate 206 on a glass interposer 208, which may be similar to EO substrate 106 on a glass interposer 108 of FIG. 1. In embodiments, the PIC 210 may be physically and electrically coupled using conductive metal-filled through glass vias (TGV) 213. In the embodiment shown, the optical waveguide 204 is embedded in the EO substrate 206.

A beam of light 205 enters the optical waveguide 204, and passes through the transparent grating 220, where various wavelengths may be separated as discussed above with respect to optical assembly 200a. As the beam of light 205 passes through the lens 222, the beam of light 205 will narrow to provide a focused beam 205a that will align with the optical connectors 212a, 212b, and 212c. In addition, as the beam of light 205 travels through the Faraday rotator 224, the beam of light 205 is prevented from reflecting back toward the optical waveguide 204 and creating optical noise.

Figure 3:
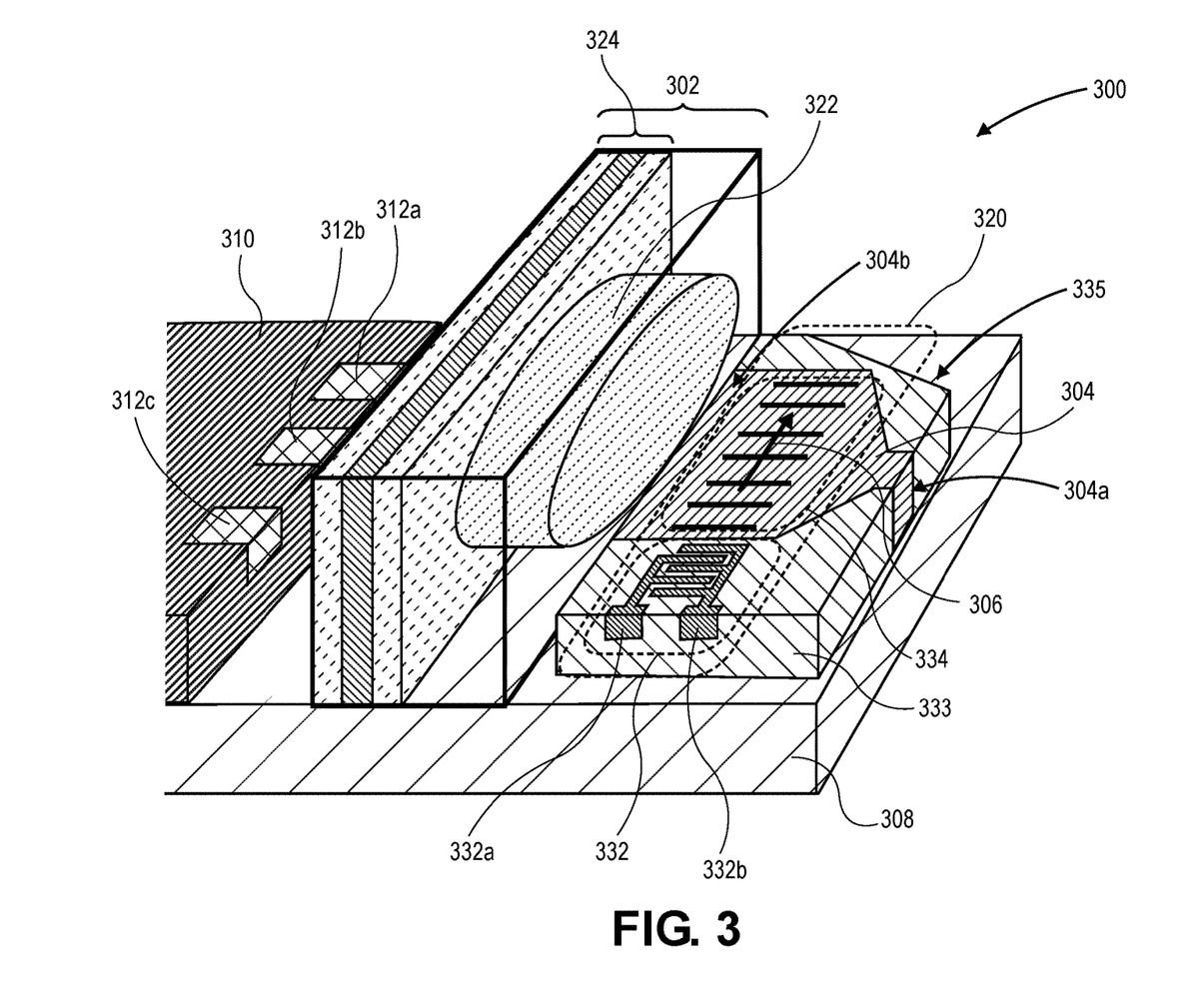
FIG. 3 shows a perspective view of an optical coupler that uses induced diffraction grating, in accordance with various embodiments.

FIG. 3 shows a perspective view of an optical coupler that uses induced diffraction grating, in accordance with various embodiments. Optical assembly 300 includes an integrated optical coupler 302, which may be similar to integrated optical coupler 102 of FIG. 1, which is optically coupled with an optical waveguide 304, which may be similar to optical waveguide 104 of FIG. 1, with a front edge 304a and a back edge 304b. In embodiments, the optical waveguide 304 may be completely within, partially within, or on an EO substrate 306, which may be similar to EO substrate 106 of FIG. 1. The EO substrate 306 and the optical waveguide 304 may be on an interposer 308, which may be similar to interposer 108 of FIG. 1. In embodiments, the interposer 308 may be a glass interposer. A PIC 310, that may be similar to PIC 110 of FIG. 1 that includes a plurality of optical connectors 312a, 312b, 312c, may be on the interposer 308 as well.

Integrated optical coupler 302 differs from integrated optical coupler 102 shown in FIG. 1. Integrated optical coupler 302 includes an optical lens 322 and a Faraday rotator 324, which may be similar to optical lens 122 and Faraday rotator 124 of FIG. 1. An induced diffraction grating 320, which performs light diffraction using an acoustic wave front 334, is optically coupled with the optical lens 322. The induced diffraction grating 320 includes a transducer 332. When a voltage is applied to the transducer 332 at electrical contacts 332a, 332b, an acoustic wave front 334 is formed, represented here by individual lines traveling in the acoustical direction 333. As the voltage applied to the transducer 332 is varied, light passing through the waveguide is diffracted in different ways as different acoustic wave fronts 334 are formed or modified. In embodiments, the induced diffraction grating 320 may also be referred to as an acoustic optic modulator.

An acoustic absorber 335 may also be a part of the induced diffraction grating 320. As shown in FIG. 3, the acoustic absorber 335 is an edge that is formed (e.g. cut) into the side of the EO substrate 306, where the plane of the edge of the acoustic absorber 335 is not perpendicular to the acoustical direction 333. Thus, the generated acoustic wave front 334 will not be reflected back to the transducer 332, and thus will not add noise to the acoustic wave front 334. In other embodiments, the acoustic absorber 335 may include a material such as, but not limited to, a porous epoxy laminate to absorb sound generated by the transducer 332.

Figure 4:
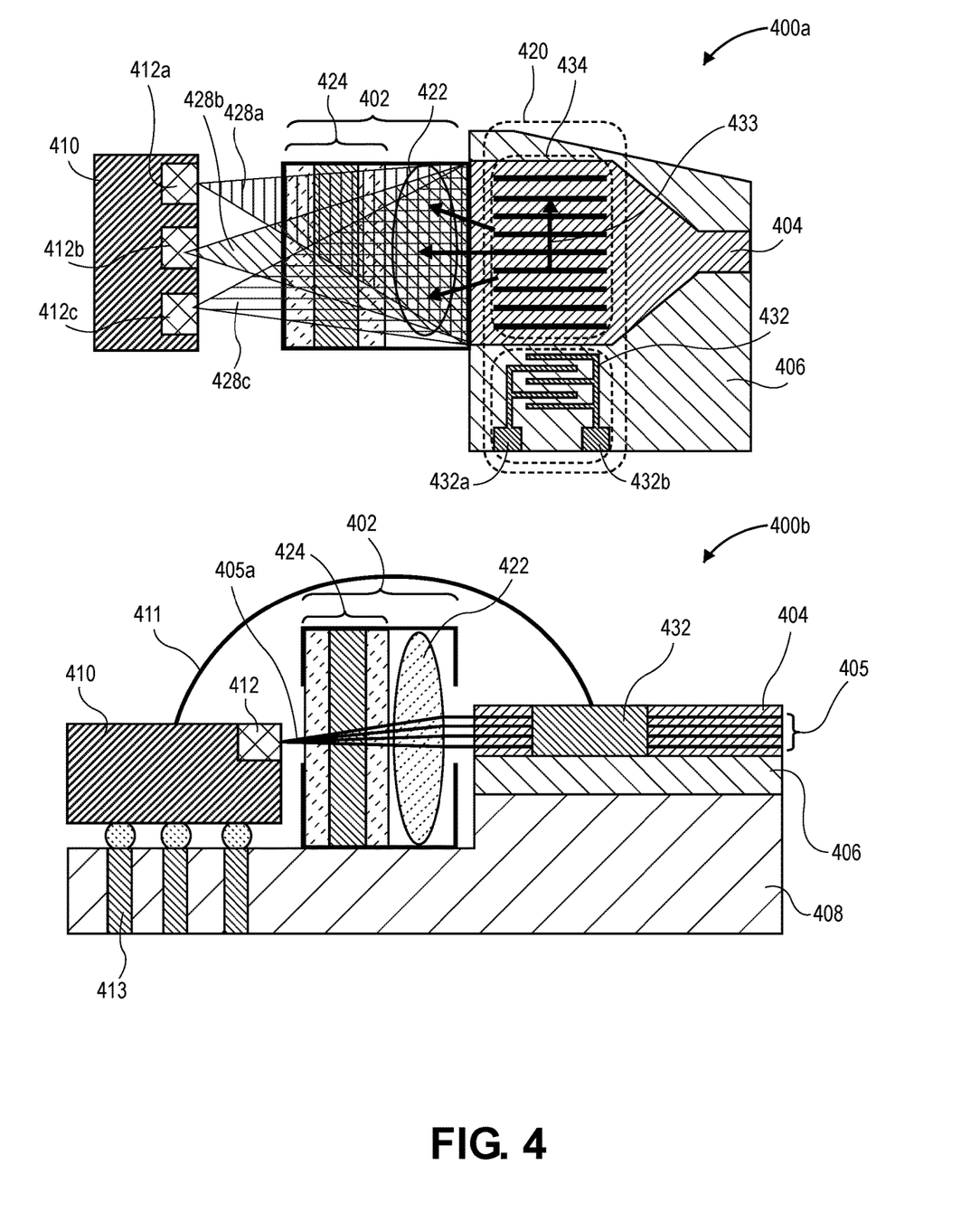
FIG. 4 shows a top-down view and a cross section side view of an optical coupler that uses induced diffraction grating, in accordance with various embodiments.

FIG. 4 shows a top-down view and a cross section side view of an optical coupler that uses induced diffraction grating, in accordance with various embodiments. Optical assembly 400a, which may be similar to portions of optical assembly 300 of FIG. 3, is a top-down view that includes a PIC 410 that includes three optical connectors 412a, 412b, 412c that are optically coupled with an integrated optical coupler 402. The integrated optical coupler 402 may include an optical lens 422 and a Faraday rotator 424. These may be similar to PIC 310, optical connectors 312a, 312b, 312c, integrated optical coupler 302, optical lens 322, and Faraday rotator 324 of FIG. 3.

In embodiments, the integrated optical coupler 402 may be optically coupled with an optical waveguide 404, which may be similar to optical waveguide 304 of FIG. 3. An induced diffraction grating 420, which may be similar to induced diffraction grating 320 of FIG. 3, performs light diffraction using an acoustic wave front 434. The induced diffraction grating 420 includes a transducer 432, which may be similar to transducer 332 of FIG. 3. An acoustic wave front 434 is formed when a voltage is applied to the transducer 432 at electrical contacts 432a, 432b, traveling in the acoustical direction 433. These may be similar to acoustic wave front 334, transducer 332 and acoustical direction 333 of FIG. 3.

In embodiments, light passing through the optical waveguide 404 and into the induced diffraction grating 420 may contain multiple wavelengths that may be separated by the induced diffraction grating 420 into individual light beams 428a, 428b, 428c. In embodiments, each of these individual light beams may be targeted to a different optical connector on the PIC 410. For example, light beam 428a may be targeted to optical connector 412a, light beam 428b may be targeted to optical connector 412b, and light beam 428c may be targeted to optical connector 412c. Embodiments, the structure of the induced diffraction grating 420 may be designed to separate various wavelengths as well as to focus them in their respective different directions.

Optical assembly 400b, which may be similar to optical assembly 400a, is a cross section side view that also shows an EO substrate 406 on a glass interposer 408, which may be similar to EO substrate 306 and interposer 308 of FIG. 3. In embodiments, the PIC 410 may be physically and electrically coupled using conductive metal filled through glass vias (TGV) 413. In the embodiment shown, the optical waveguide 404 is embedded into the EO substrate 406.

A beam of light 405 enters the optical waveguide 404, and passes through the induced diffraction grating 420, where various wavelengths may be separated as discussed above with respect to optical assembly 400a. As the beam of light 405 passes through the optical lens 422, the beam of light 405 will narrow to provide a focused beam 405a that will align with the optical connectors 412. In addition, as the beam of light 405 travels through the Faraday rotator 424, the beam of light 405 is prevented from reflecting back toward the optical waveguide 404 and creating optical noise.

As described above with respect to FIG. 3, the transducer 432 may receive a voltage, a voltage variation, or an indication of a desired voltage to be applied to the transducer 432. In embodiments, this voltage information may be provided by the PIC 410. In embodiments, the PIC 410 may evaluate the alignment of the various light beams 428a, 428b, 428c, respectively, with optical connectors 412a, 412b, 412c, and determine whether any voltage changes that are to be provided to the transducer 432 to modify the alignment of the respective various light beams. In embodiments, any determined voltage changes may be communicated through an electrical connection 411 that electrically couples the PIC 410 with the transducer 432. In embodiments, the electrical connection 411 may be within the glass interposer 408, or may be routed using various build-up layers (not shown) on the glass interposer 408.

Figure 5A:
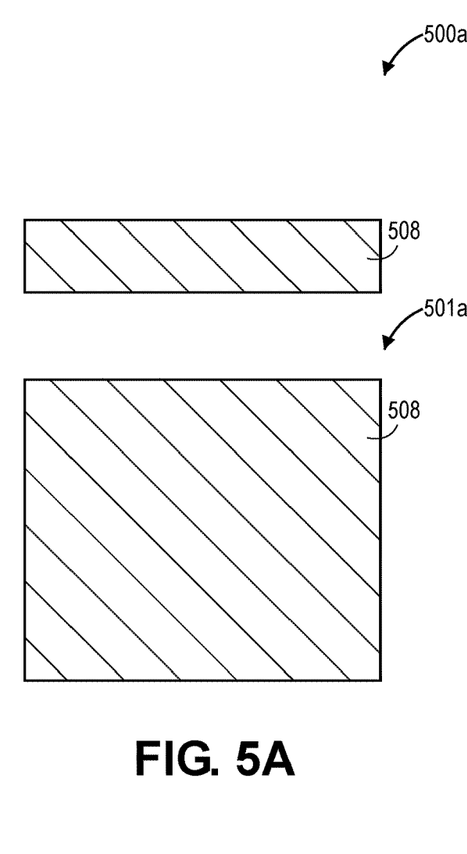
FIGS. 5A-5Q show stages in a manufacturing process for creating an acoustic wave front induced diffraction grating mechanism, in accordance with various embodiments.
Figure 5B:
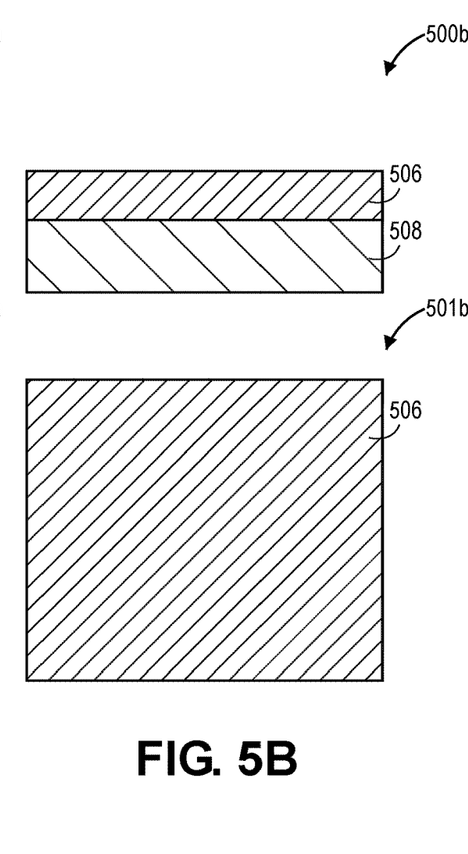
Figure 5C:
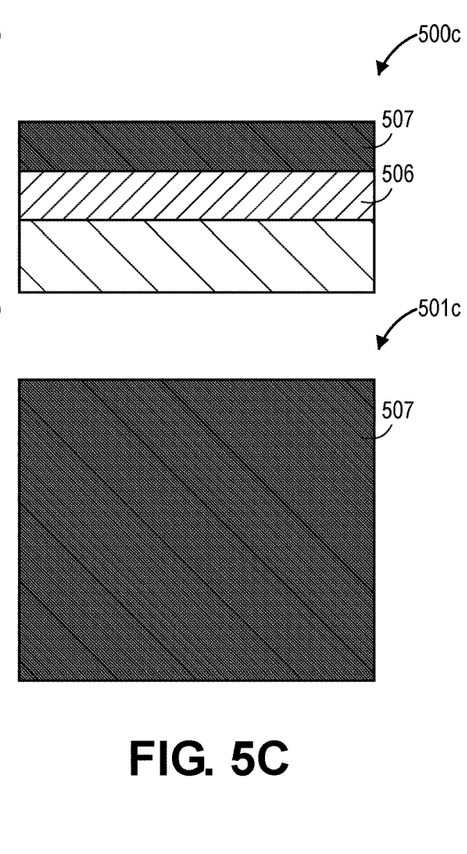
Figure 5D:
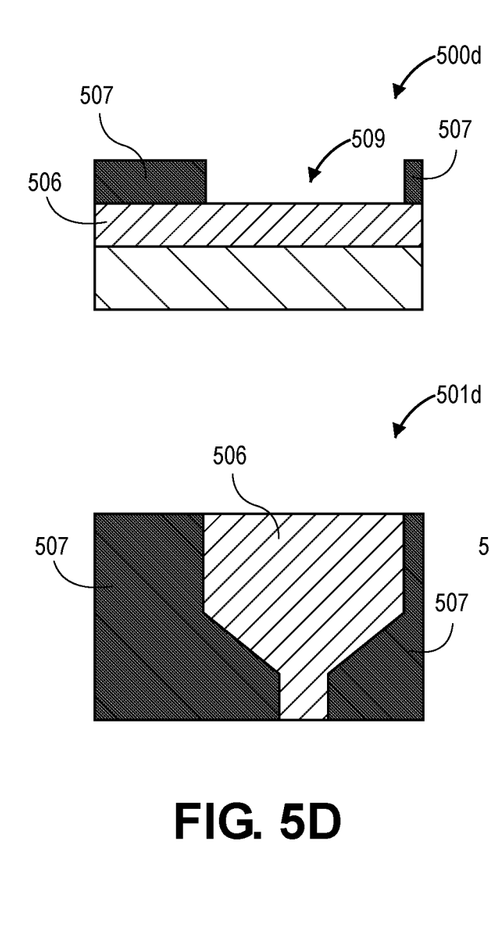
Figure 5E:
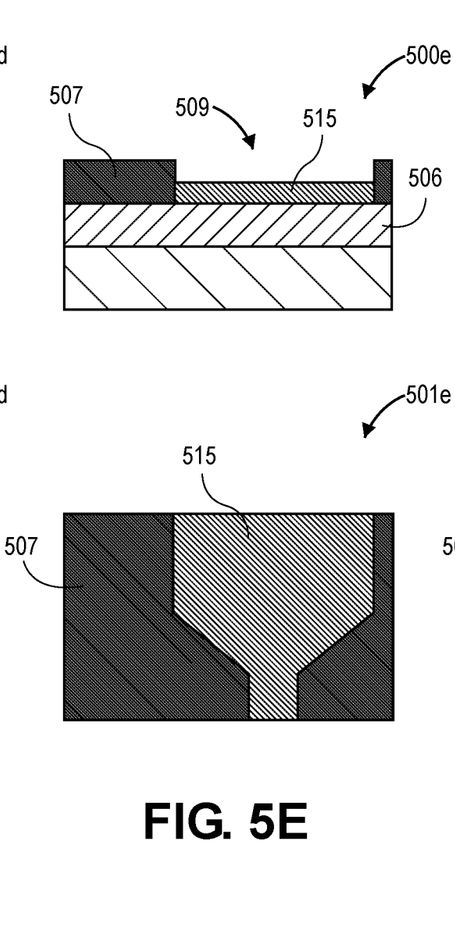
Figure 5F:
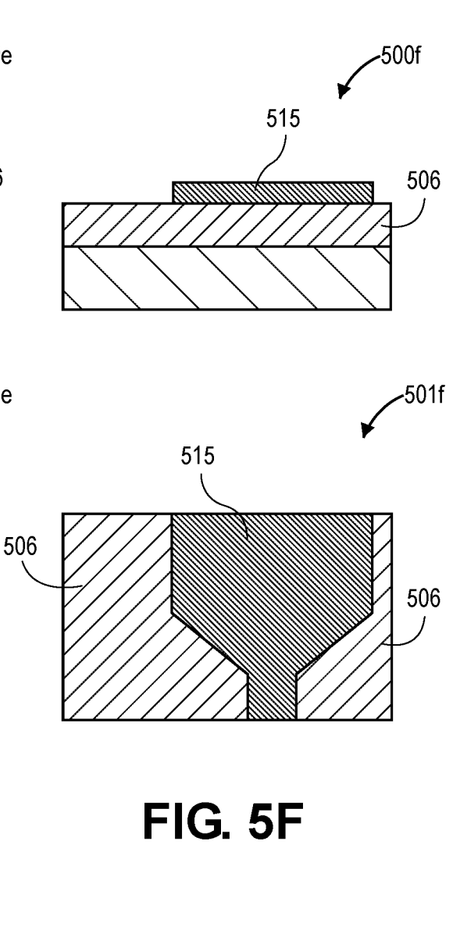
Figure 5G:
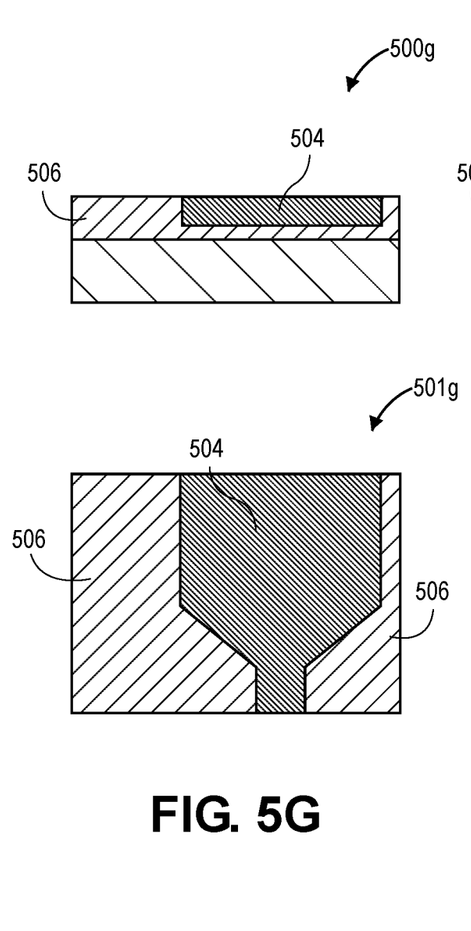
Figure 5H:
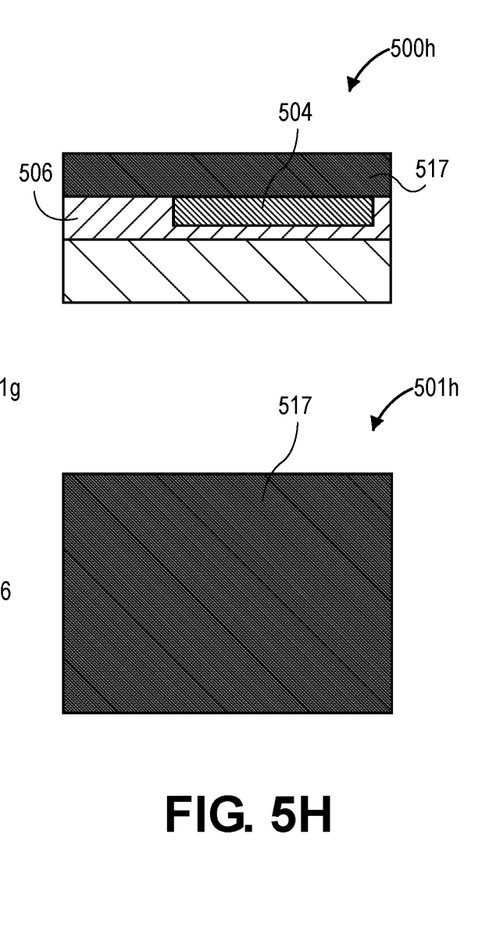
Figure 5I:
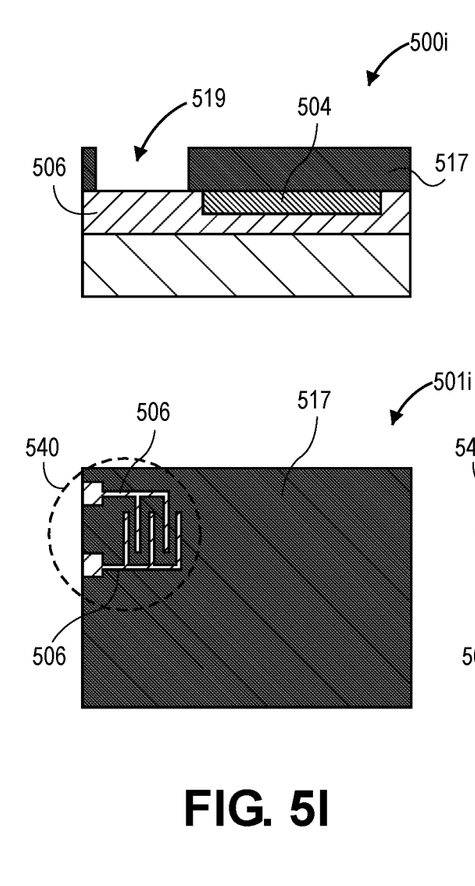
Figure 5J:
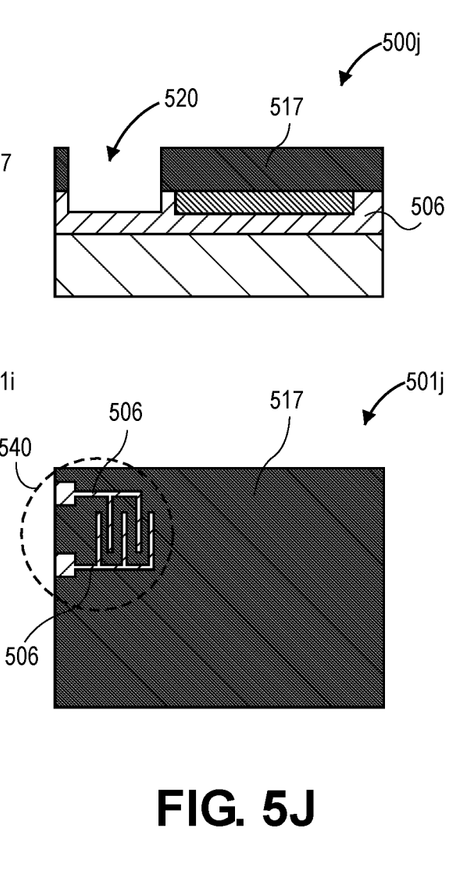
Figure 5K:
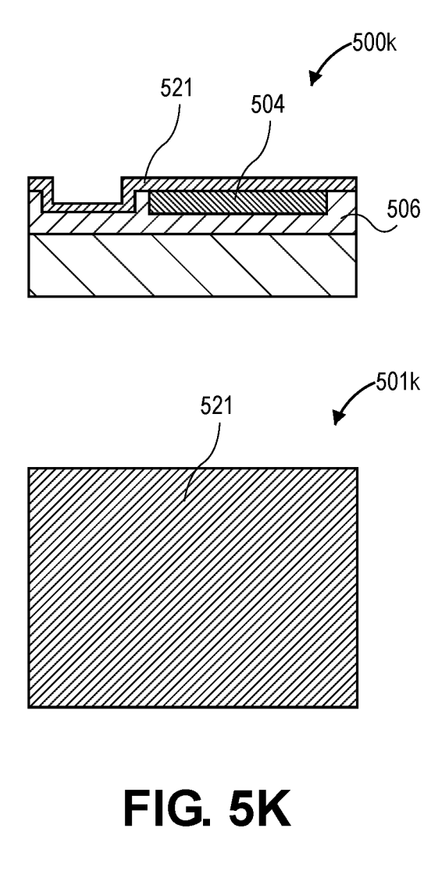
Figure 5L:
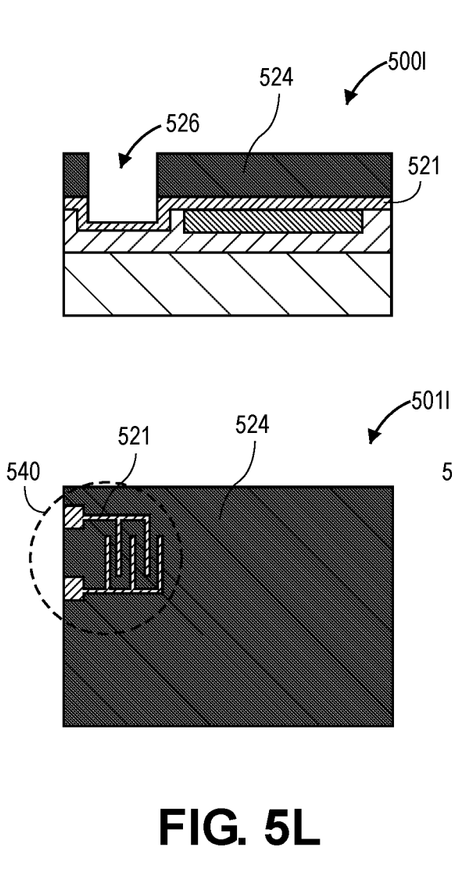
Figure 5M:
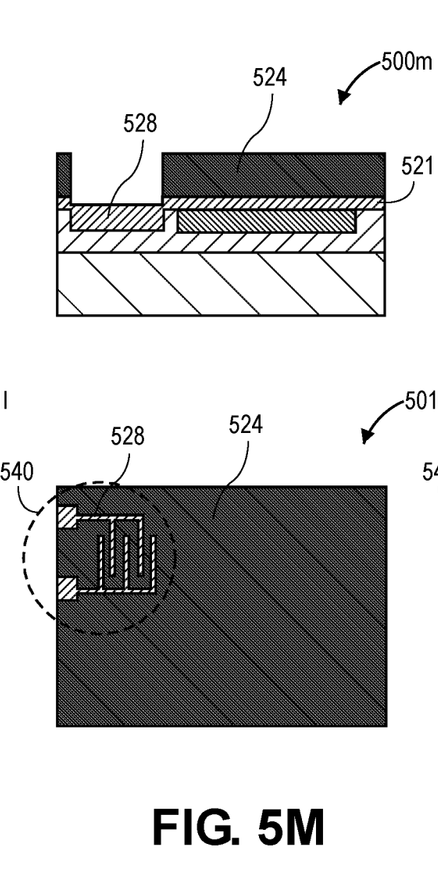
Figure 5N:
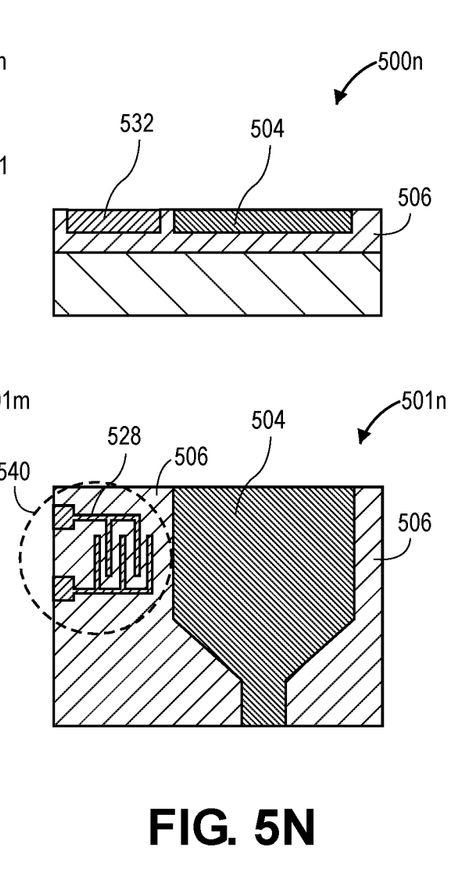
Figure 5O:
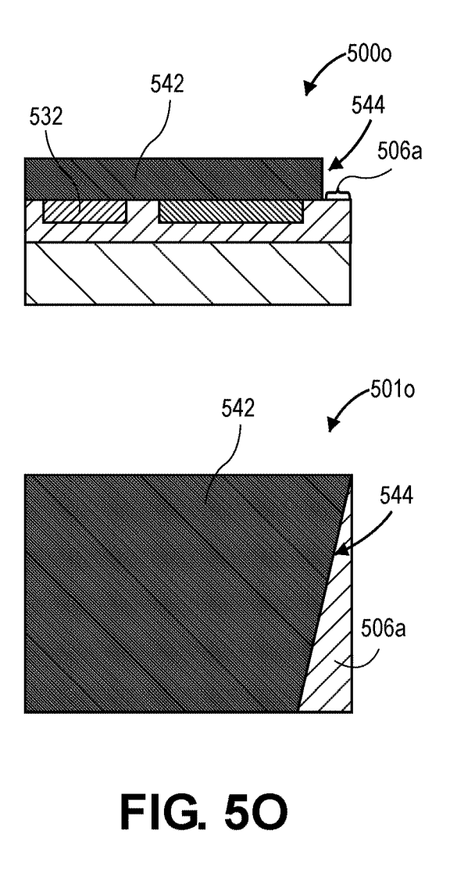
Figure 5P:
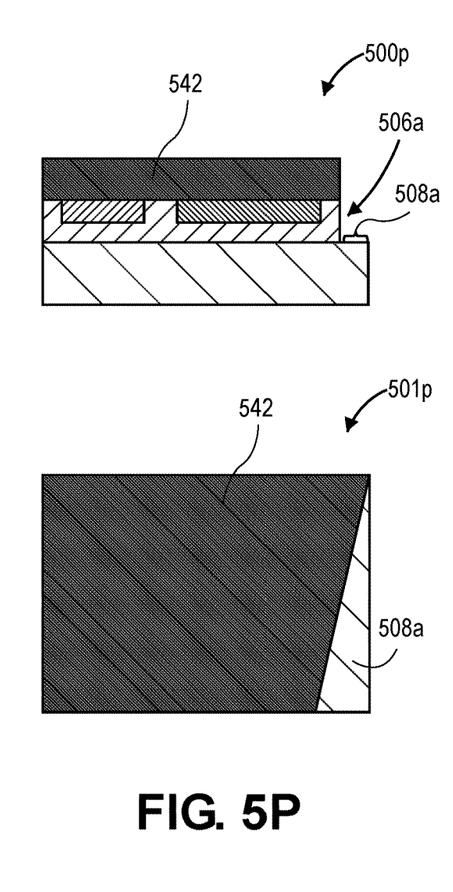
Figure 5Q:
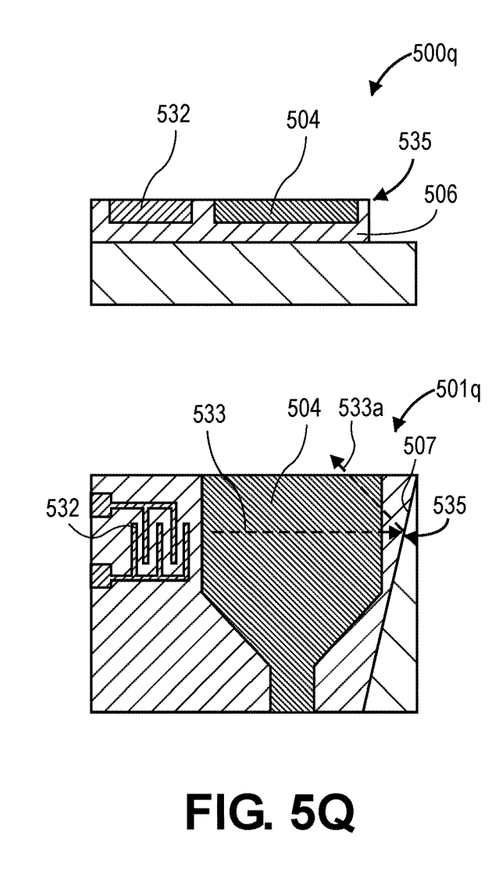

FIGS. 5A-5Q show stages in a manufacturing process for creating an acoustic wave front induced diffraction grating mechanism, in accordance with various embodiments. These stages may be implemented using the tools, techniques, processes, apparatus, or systems as described herein, and in particular with respect to FIGS. 1-4 and 6.

FIG. 5A shows a cross section side view 500a and a top-down view 501a of a stage in the manufacturing process where an interposer 508, which may be similar to interposer 108 of FIG. 1, is provided. In embodiments, the interposer 508 may be a layer or a substrate layer, and may include silicon or a glass. In embodiments, quartz glass may be used depending upon temperature requirements for deposition techniques described further below.

FIG. 5B shows a cross section side view 500b and a top-down view 501b of a stage in the manufacturing process where an EO substrate 506 is placed upon the interposer 508. In embodiments, the EO substrate 506 may include gallium, phosphorous, arsenic, lead, molybdenum, oxygen, tellurium, titanium, sulfur, strontium, barium, niobium, lithium, tantalum, GaP, GaAs, $PbMoO_4$, $TeO_2$, $Ti_3AsS_4$, $Sr_{0.75}Ba_{0.25}Nb_2O_6$, $LiNbO_3$, or $LiTaO_3$. In embodiments, the EO substrate 506 may be deposited by a number of fabrication techniques, including but not limited to radiof-Frequency magnetron sputtering (RFMS), Ion-beam sputtering (IBS), pulsed-laser deposition (PLD), chemical vapor deposition (CVD), liquid phase epitaxy (LPE), or sol-gel processing.

In other embodiments, the EO substrate 506 may be grown separately on the silicon wafer (not shown), and then subsequently mounted upon a glass wafer that is used in interposer 508.

FIG. 5C shows a cross section side view 500c and a top-down view 501c of a stage in the manufacturing process where the lithography mask 507 is placed upon the EO substrate 506. In embodiments, the lithography mask 507 may be applied to the EO substrate 506 using techniques known in the art.

FIG. 5D shows a cross section side view 500d a top-down view 501d of a stage in the manufacturing process where the cavity 509 is removed within the lithography mask 507 to expose a portion of the EO substrate 506. In embodiments, this removal may be accomplished using an etching process that is known in the art.

FIG. 5E shows a cross section side view 500e and a top-down view 501e of a stage in the manufacturing process where a metal 515 is placed within cavity 509. In embodiments, this placement may include sputtering. In embodiments, the metal 515 may include titanium.

FIG. 5F shows a cross section side view 500f and a top-down view 501f of a stage in the manufacturing process where the lithography mask 507 has been removed. In embodiments, the lithography mask 507 may be etched to the surface of the EO substrate 506. This leaves metal 515 on top of a portion of the EO substrate 506.

FIG. 5G shows a cross section side view 500g and a top-down view 501g of a stage in the manufacturing process where an annealing process has been performed, which creates optical waveguide 504 within the EO substrate 506 underneath the metal 515. Optical waveguide 504 may be similar to optical waveguide 304 of FIG. 3.

FIG. 5H shows a cross section side view 500h and a top-down view 501h of a stage in the manufacturing process where another lithography mask 517 is laminated onto the EO substrate 506 and the optical waveguide 504.

FIG. 5I shows a cross section side view 500i and a top-down view 501i of a stage in the manufacturing process where cavity 519 is removed within the lithography mask 517 to expose a portion of the EO substrate 506. In embodiments, this removal may be accomplished using an etching process that is known in the art. In embodiments, the cavity 519 may form a transducer outline shape 540.

FIG. 5J shows a cross section side view 500j and a top-down view 501j of a stage in the manufacturing process where a cavity 520 is removed within the EO substrate 506. In embodiments, the cavity 520 extends into a portion of the EO substrate 506, but not all the way through. In embodiments, the cavity 520 is in the form of the transducer outline shape 540.

FIG. 5K shows a cross section side view 500k and a top-down view 501k of the stage in the manufacturing process, where the lithography mask 517 is removed, and a seed layer 521 is deposited on a top of the EO substrate 506 and the optical waveguide 504. In embodiments, the seed layer 521 is a copper seed layer.

FIG. 5L shows a cross section side view 500l and a top-down view 501l of a stage in the manufacturing process, where another lithography mask 524 is placed on the seed layer 521, and the cavity 526 is etched in the lithography mask 524. In embodiments, the cavity 526 is in the form of the transducer outline shape 540.

FIG. 5M shows a cross section side view 500m and a top-down view 501m of a stage in the manufacturing process where a layer of copper plating 528 is placed. In embodiments, the layer of copper plating 528 is in the form of the transducer outline shape 540.

FIG. 5N shows a cross section side view 500n and a top-down view 501n of a stage in the manufacturing process where the lithography mask 524 is stripped, and the seed layer 521 is etched away, exposing the copper plating 528 and the transducer 532 that is embedded into the EO substrate 506.

FIG. 5O shows a cross section side view 500o and a top-down view 501o of a stage in the manufacturing process where a lithography mask 542, that includes a cutout portion 544 that exposes a portion of the EO layer 506a.

FIG. 5P shows a cross section side view 500p and a top-down view 501p of a stage in the manufacturing process where a plasma etch has occurred to remove portion of the EO layer 506a, exposing a portion of the interposer 508a.

FIG. 5Q shows a cross section side view 500q and a top-down view 501q of a stage in the manufacturing process where the mask where the lithography mask 542 is removed, leaving the transducer 532 next to the optical waveguide 504, both embedded within the EO substrate 506. An edge of the EO substrate 506, is not perpendicular to a direction of sound waves formed by the transducer 532, and therefore the edge of the EO substrate 506 forms an acoustic absorber 535, which may be similar to acoustic absorber 335 of FIG. 3. During operation, the transducer 532 will generate an acoustic wave front, which may be similar to acoustic wave front 334 of FIG. 3, traveling in a direction 533. The acoustic absorber 535 is not perpendicular to the direction 533, and therefore will bounce any acoustic wave front received in direction 533a, which will not interfere with the original acoustic wave front traveling in direction 533. In embodiments, these components make up a part of an induced diffraction grating, such as induced diffraction grating 320 of FIG. 3.

Figure 6:
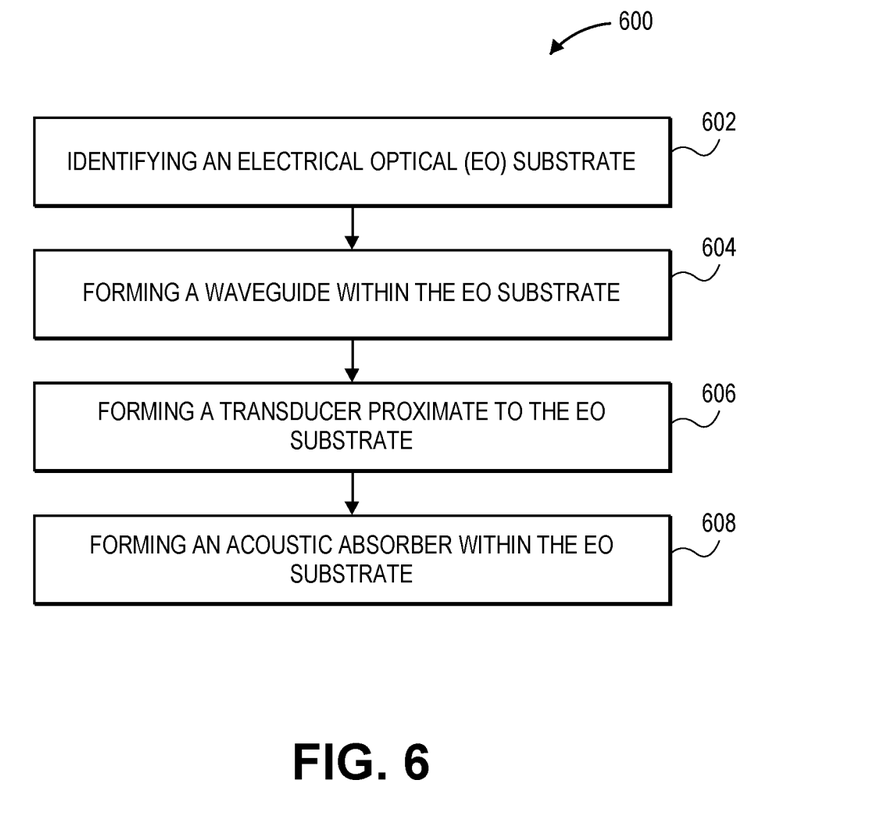
FIG. 6 illustrates an example of a process for creating an optical coupler, in accordance with various embodiments.

FIG. 6 illustrates an example of a process for creating an integrated optical coupler in accordance with embodiments. Process 600 may be performed by one or more elements, techniques, or systems that may be described herein, and in particular with respect to FIGS. 1-5Q.

At block 602, the process may include identifying an EO substrate. They EO substrate may be similar to EO substrate 106 of FIG. 1, 206 of FIG. 2, 306 of FIG. 3, 406 of FIG. 4, or 506 of FIG. 5.

At block 604, the process may further include forming a waveguide within the EO substrate. In embodiments, the waveguide may be an optical waveguide similar to optical waveguide 104 of FIG. 1, 204 of FIG. 2, 304 FIG. 3, 404 of FIG. 4, or 504 of FIG. 5.

At block 606, the process may further include forming a transducer proximate to the EO substrate. In embodiments, the transducer may be similar to transducer 332 of FIG. 3, 432 of FIG. 4, or 532 of FIG. 5.

At block 608, the process may further include forming an acoustic absorber within the EO substrate. In embodiments, the acoustic absorber may be similar to acoustic absorber 335 of FIG. 3, 435 of FIG. 4, or 535 of FIG. 5.

Figure 7:
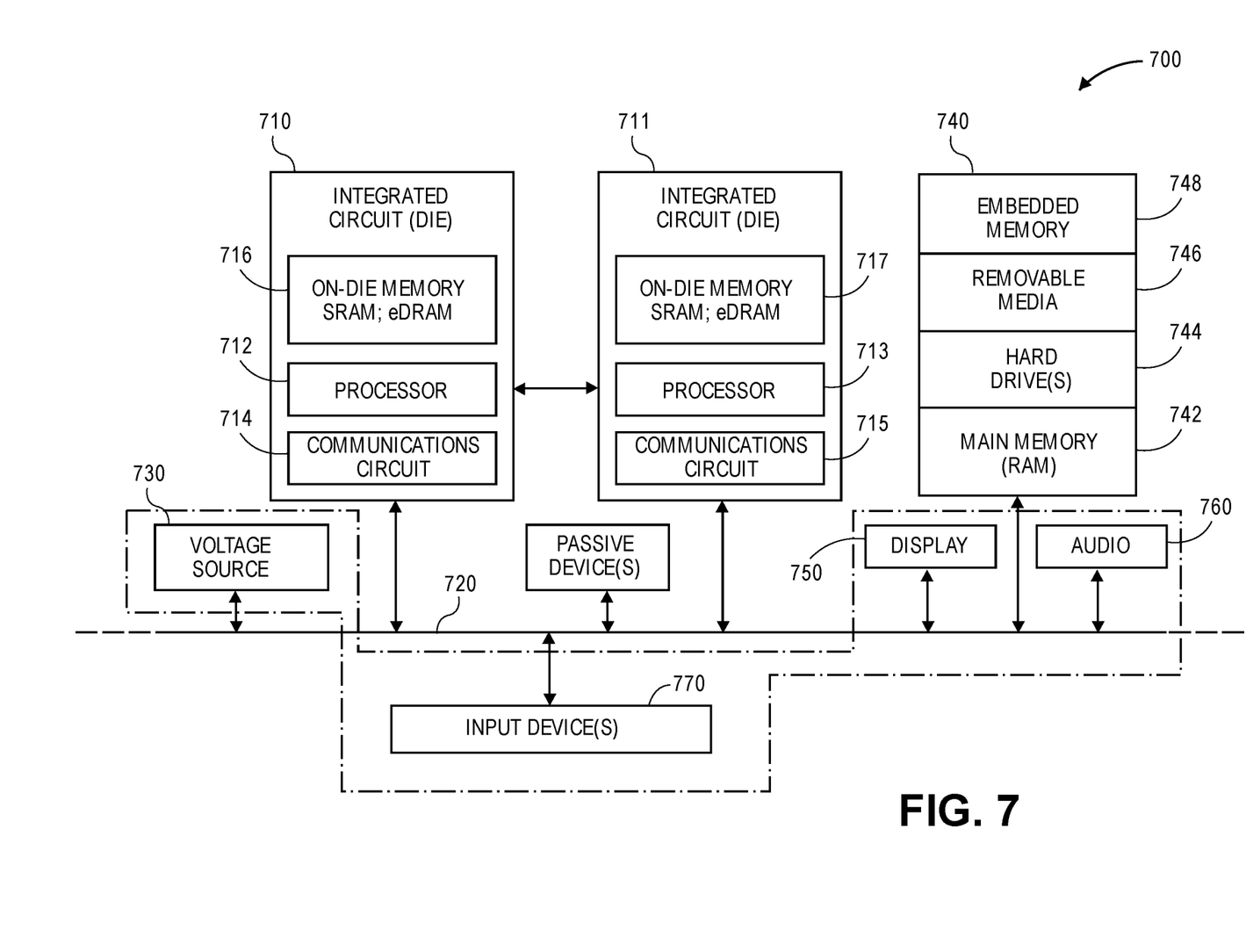
FIG. 7 schematically illustrates a computing device, in accordance with embodiments.

FIG. 7 is a schematic of a computer system 700, in accordance with an embodiment of the present invention. The computer system 700 (also referred to as the electronic system 700) as depicted can embody an integrated optical coupler, according to any of the several disclosed embodiments and their equivalents as set forth in this disclosure. The computer system 700 may be a mobile device such as a netbook computer. The computer system 700 may be a mobile device such as a wireless smart phone. The computer system 700 may be a desktop computer. The computer system 700 may be a hand-held reader. The computer system 700 may be a server system. The computer system 700 may be a supercomputer or high-performance computing system.

In an embodiment, the electronic system 700 is a computer system that includes a system bus 720 to electrically couple the various components of the electronic system 700. The system bus 720 is a single bus or any combination of busses according to various embodiments. The electronic system 700 includes a voltage source 730 that provides power to the integrated circuit 710. In some embodiments, the voltage source 730 supplies current to the integrated circuit 710 through the system bus 720.

The integrated circuit 710 is electrically coupled to the system bus 720 and includes any circuit, or combination of circuits according to an embodiment. In an embodiment, the integrated circuit 710 includes a processor 712 that can be of any type. As used herein, the processor 712 may mean any type of circuit such as, but not limited to, a microprocessor, a microcontroller, a graphics processor, a digital signal processor, or another processor. In an embodiment, the processor 712 includes, or is coupled with, an integrated optical coupler, as disclosed herein. In an embodiment, SRAM embodiments are found in memory caches of the processor. Other types of circuits that can be included in the integrated circuit 710 are a custom circuit or an application-specific integrated circuit (ASIC), such as a communications circuit 714 for use in wireless devices such as cellular telephones, smart phones, pagers, portable computers, two-way radios, and similar electronic systems, or a communications circuit for servers. In an embodiment, the integrated circuit 710 includes on-die memory 716 such as static random-access memory (SRAM). In an embodiment, the integrated circuit 710 includes embedded on-die memory 716 such as embedded dynamic random-access memory (eDRAM).

In an embodiment, the integrated circuit 710 is complemented with a subsequent integrated circuit 711. Useful embodiments include a dual processor 713 and a dual communications circuit 715 and dual on-die memory 717 such as SRAM. In an embodiment, the dual integrated circuit 710 includes embedded on-die memory 717 such as eDRAM.

In an embodiment, the electronic system 700 also includes an external memory 740 that in turn may include one or more memory elements suitable to the particular application, such as a main memory 742 in the form of RAM, one or more hard drives 744, and/or one or more drives that handle removable media 746, such as diskettes, compact disks (CDs), digital variable disks (DVDs), flash memory drives, and other removable media known in the art. The external memory 740 may also be embedded memory 748 such as the first die in a die stack, according to an embodiment.

In an embodiment, the electronic system 700 also includes a display device 750, an audio output 760. In an embodiment, the electronic system 700 includes an input device 770 such as a controller that may be a keyboard, mouse, trackball, game controller, microphone, voice-recognition device, or any other input device that inputs information into the electronic system 700. In an embodiment, an input device 770 is a camera. In an embodiment, an input device 770 is a digital sound recorder. In an embodiment, an input device 770 is a camera and a digital sound recorder.

As shown herein, the integrated circuit 710 can be implemented in a number of different embodiments, including a package substrate having an integrated optical coupler, according to any of the several disclosed embodiments and their equivalents, an electronic system, a computer system, one or more methods of fabricating an integrated circuit, and one or more methods of fabricating an electronic assembly that includes a package substrate having an integrated optical coupler, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed package substrates having an integrated optical coupler embodiments and their equivalents. A foundation substrate may be included, as represented by the dashed line of FIG. 7. Passive devices may also be included, as is also depicted in FIG. 7.

EXAMPLES

The following paragraphs describe examples of various embodiments.

Example 1 is an optical coupler comprising: an electrical optical (EO) substrate; an optical waveguide within the EO substrate; and a transparent grating, a side of the transparent grating optically coupled with an edge of the optical waveguide.

Example 2 may include the optical coupler of example 1, or of any other example or embodiments described herein, wherein the side of the transparent grating is physically coupled with the edge of the optical waveguide.

Example 3 may include the optical coupler of example 2, or of any other example or embodiments described herein, wherein an optical epoxy physically couples the side of the transparent grating with the edge of the optical waveguide.

Example 4 may include the optical coupler of example 1, or of any other example or embodiments described herein, wherein a width of the edge of the optical waveguide is greater than a width of the optical waveguide at a location away from the edge of the optical waveguide.

Example 5 may include the optical coupler of example 1, or of any other example or embodiments described herein, wherein the EO substrate includes a selected one or more of: gallium, phosphorous, arsenic, lead, molybdenum, oxygen, tellurium, titanium, sulfur, strontium, barium, niobium, lithium, tantalum, GaP, GaAs, PbMoO4, TeO2, Ti3AsS4, Sr0.75Ba0.25Nb2O6, LiNbO3, or LiTaO3.

Example 6 may include the optical coupler of example 1, or of any other example or embodiments described herein, wherein the side of the transparent grating is a first side; and further comprising: a second side of the transparent grating opposite the first side; and a lens optically coupled with the second side of the transparent grating.

Example 7 may include the optical coupler of example 6, or of any other example or embodiments described herein, further comprising a Faraday rotator optically coupled with the lens.

Example 8 may include the optical coupler of example 1, or of any other example or embodiments described herein, wherein the transparent grating further includes one or more grating widths determined based upon a wavelength of light through the optical waveguide and location of one or more optical inputs of a photonics integrated circuit (PIC).

Example 9 may include the optical coupler of example 8, or of any other example or embodiments described herein, wherein the optical coupler and the PIC are physically coupled with another substrate, and wherein the optical coupler is optically coupled with the one or more optical inputs of the PIC.

Example 10 may include the optical coupler of example 9, or of any other example or embodiments described herein, wherein the other substrate is a glass substrate.

Example 11 is an optical coupler comprising: an electrical optical (EO) substrate; an optical waveguide within the EO substrate; and an acousto-optic modulator (AOM) optically coupled with the optical waveguide.

Example 12 may include the optical coupler of example 11, or of any other example or embodiments described herein, wherein the AOM further includes: a transducer proximate to the optical waveguide; and an acoustic absorber proximate to the optical waveguide.

Example 13 may include the optical coupler of example 12, or of any other example or embodiments described herein, wherein the transducer is within the EO substrate.

Example 14 may include the optical coupler of example 13, or of any other example or embodiments described herein, wherein the acoustic absorber is within the EO substrate on a side opposite the transducer.

Example 15 may include the optical coupler of example 12, or of any other example or embodiments described herein, wherein the acoustic absorber comprises an edge of the EO substrate perpendicular to a surface of the EO substrate, wherein the edge of the EO substrate is not perpendicular to a direction of acoustic energy generated from the transducer Example 16 may include the optical coupler of example 11, or of any other example or embodiments described herein, wherein an indication of a voltage applied to the transducer is received from a photonics integrated circuit (PIC).

Example 17 may include the optical coupler of example 11, or of any other example or embodiments described herein, further comprising a lens optically coupled with the AOM.

Example 18 may include the optical coupler of example 17, or of any other example or embodiments described herein, further comprising a Faraday rotator optically coupled with the lens.

Example 19 is a method for creating an optical coupler, the method comprising: identifying an electrical optical (EO) substrate; forming a waveguide within the EO substrate; forming a transducer proximate to the EO substrate; and forming an acoustic absorber within the EO substrate.

Example 20 may include the method of example 19, or of any other example or embodiments described herein, wherein the EO substrate includes a selected one or more of: gallium, phosphorous, arsenic, lead, molybdenum, oxygen, tellurium, titanium, sulfur, strontium, barium, niobium, lithium, tantalum, GaP, GaAs, PbMoO4, TeO2, Ti3AsS4, Sr0.75Ba0.25Nb2O6, LiNbO3, or LiTaO3.

Example 21 may include the method of example 19, or of any other example or embodiments described herein, wherein forming the transducer proximate to the EO substrate further includes forming the transducer within the EO substrate.

Example 22 may include the method of example 19, or of any other example or embodiments described herein, wherein forming the acoustic absorber further includes forming an edge of the EO substrate perpendicular to a surface of the EO substrate, wherein the edge of the EO substrate is not perpendicular to a direction of acoustic energy generated from the transducer.

Example 23 is an optical package comprising: an interposer; an optical coupler on the interposer, the optical coupler including: a diffraction grating; an optical lens optically coupled with the diffraction grating; and a Faraday rotator optically coupled with the optical lens; a photonics integrated circuit (PIC) on the interposer; an optical waveguide; wherein the PIC is optically coupled with the optical waveguide and the optical coupler, wherein the optical coupler is between the PIC and the optical waveguide.

Example 24 may include the optical package of example 23, or of any other example or embodiments described herein, wherein the diffraction grating is a selected one of: a transparent grating or an induced diffraction grating.

Example 25 may include the optical package of example 23, or of any other example or embodiments described herein, wherein the PIC includes a plurality of optical connectors, and wherein the optical coupler couples various wavelengths of light between the optical waveguide and the plurality of optical connectors.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

What is claimed is:

1. An optical coupler comprising:
    an electrical optical (EO) substrate;
    an optical waveguide within the EO substrate;
    a transparent grating having a first side opposite a second side, the first side of the transparent grating optically coupled with an edge of the optical waveguide; and
    a lens optically coupled with the second side of the transparent grating.

2. The optical coupler of claim 1, wherein the first side of the transparent grating is physically coupled with the edge of the optical waveguide.

3. The optical coupler of claim 2, wherein an optical epoxy physically couples the first side of the transparent grating with the edge of the optical waveguide.

4. The optical coupler of claim 1, wherein a width of the edge of the optical waveguide is greater than a width of the optical waveguide at a location away from the edge of the optical waveguide.

5. The optical coupler of claim 1, wherein the EO substrate includes a selected one or more of: gallium, phosphorous, arsenic, lead, molybdenum, oxygen, tellurium, titanium, sulfur, strontium, barium, niobium, lithium, tantalum, GaP, GaAs, $PbMoO_4$, $TeO_2$, $Ti_3AsS_4$, $Sr_{0.75}Ba_{0.25}Nb_2O_6$, $LiNbO_3$, or $LiTaO_3$.

6. The optical coupler of claim 1, further comprising a Faraday rotator optically coupled with the lens.

7. The optical coupler of claim 1, wherein the transparent grating further includes one or more grating widths determined based upon a wavelength of light through the optical waveguide and location of one or more optical inputs of a photonics integrated circuit (PIC).

8. The optical coupler of claim 7, wherein the optical coupler and the PIC are physically coupled with another substrate, and wherein the optical coupler is optically coupled with the one or more optical inputs of the PIC.

9. The optical coupler claim 8, wherein the other substrate is a glass substrate.

10. An optical coupler comprising:
    an electrical optical (EO) substrate;
    an optical waveguide within the EO substrate; and
    a transparent grating, a side of the transparent grating optically coupled with an edge of the optical waveguide, wherein the side of the transparent grating is physically coupled with the edge of the optical waveguide, and wherein an optical epoxy physically couples the side of the transparent grating with the edge of the optical waveguide.

11. The optical coupler of claim 10, wherein a width of the edge of the optical waveguide is greater than a width of the optical waveguide at a location away from the edge of the optical waveguide.

12. The optical coupler of claim 10 wherein the EO substrate includes a selected one or more of: gallium, phosphorous, arsenic, lead, molybdenum, oxygen, tellurium, titanium, sulfur, strontium, barium, niobium, lithium, tantalum, GaP, GaAs, $PbMoO_4$, $TeO_2$, $Ti_3AsS_4$, $Sr_{0.75}Ba_{0.25}Nb_2O_6$, $LiNbO_3$, or $LiTaO_3$.

13. The optical coupler of claim 10, wherein the transparent grating further includes one or more grating widths determined based upon a wavelength of light through the optical waveguide and location of one or more optical inputs of a photonics integrated circuit (PIC).

14. The optical coupler of claim 13, wherein the optical coupler and the PIC are physically coupled with another substrate, and wherein the optical coupler is optically coupled with the one or more optical inputs of the PIC.

15. The optical coupler claim 14, wherein the other substrate is a glass substrate.

16. An optical coupler comprising:
an electrical optical (EO) substrate;
an optical waveguide within the EO substrate; and
a transparent grating, a side of the transparent grating optically coupled with an edge of the optical waveguide, wherein a width of the edge of the optical waveguide is greater than a width of the optical waveguide at a location away from the edge of the optical waveguide.

17. The optical coupler of claim 16, wherein the EO substrate includes a selected one or more of: gallium, phosphorous, arsenic, lead, molybdenum, oxygen, tellurium, titanium, sulfur, strontium, barium, niobium, lithium, tantalum, GaP, GaAs, $PbMoO_4$, $TeO_2$, $Ti_3AsS0_4$, $Sr_{0.75}Ba_{0.25}Nb_2O_6$, $LiNbO_3$, or $LiTaO_3$.

18. The optical coupler of claim 16, wherein the transparent grating further includes one or more grating widths determined based upon a wavelength of light through the optical waveguide and location of one or more optical inputs of a photonics integrated circuit (PIC).

19. The optical coupler of claim 18, wherein the optical coupler and the PIC are physically coupled with another substrate, and wherein the optical coupler is optically coupled with the one or more optical inputs of the PIC.

20. The optical coupler claim 19, wherein the other substrate is a glass substrate.

21. An optical coupler comprising:
an electrical optical (EO) substrate;
an optical waveguide within the EO substrate; and
a transparent grating, a side of the transparent grating optically coupled with an edge of the optical waveguide, wherein the transparent grating further includes one or more grating widths determined based upon a wavelength of light through the optical waveguide and location of one or more optical inputs of a photonics integrated circuit (PIC).

22. The optical coupler of claim 21, wherein the optical coupler and the PIC are physically coupled with another substrate, and wherein the optical coupler is optically coupled with the one or more optical inputs of the PIC.

23. The optical coupler claim 22, wherein the other substrate is a glass substrate.

* * * * *